US009855839B2

(12) United States Patent
Dedeurwaerder

(10) Patent No.: US 9,855,839 B2
(45) Date of Patent: Jan. 2, 2018

(54) METHOD FOR CONTROLLING A PRESSURE INSIDE VEHICULAR FUEL TANK SYSTEM

(71) Applicant: Plastic Omnium Advanced Innovation and Research, Brussels (BE)

(72) Inventor: Jurgen Dedeurwaerder, Relegem (BE)

(73) Assignee: Plastic Omnium Advanced Innovation and Research, Brussels (BE)

(*) Notice: Subject to any disclaimer, the term of this patent is extended or adjusted under 35 U.S.C. 154(b) by 49 days.

(21) Appl. No.: 14/924,819

(22) Filed: Oct. 28, 2015

(65) Prior Publication Data

US 2016/0152132 A1 Jun. 2, 2016

(30) Foreign Application Priority Data

Nov. 27, 2014 (EP) ..................................... 14195243

(51) Int. Cl.
| | | |
|---|---|---|
| *B60K 15/00* | (2006.01) | |
| *B60K 15/035* | (2006.01) | |
| *B60W 20/18* | (2016.01) | |
| *F16K 17/00* | (2006.01) | |
| *F02M 25/08* | (2006.01) | |
| *B60K 15/03* | (2006.01) | |

(52) U.S. Cl.
CPC ....... *B60K 15/03519* (2013.01); *B60W 20/18* (2016.01); *F02M 25/08* (2013.01); *F16K 17/00* (2013.01); *B60K 2015/0319* (2013.01); *B60K 2015/03296* (2013.01); *B60K 2015/03375* (2013.01); *B60K 2015/03538* (2013.01); *B60K 2015/03557* (2013.01); *B60K 2015/03576* (2013.01); *B60Y 2200/92* (2013.01); *Y02T 10/6269* (2013.01); *Y10S 903/903* (2013.01)

(58) Field of Classification Search
CPC .... B60K 15/03519; B60K 2015/03557; B60K 2015/03576; B60K 2015/0319; B60K 2015/03375; B60K 2015/03296; B60K 2015/03538; F02M 25/08; F02M 25/089; F02M 25/0836
See application file for complete search history.

(56) References Cited

U.S. PATENT DOCUMENTS

| | | | |
|---|---|---|---|
| 9,415,680 B2* | 8/2016 | Dudar | ................. B60K 15/035 |
| 2010/0126477 A1* | 5/2010 | Reddy | ................ F02M 25/0836 123/520 |

(Continued)

OTHER PUBLICATIONS

European Search Report dated May 7, 2015 in European Application 14195243, filed on Nov. 27, 2014 ( with Written Opinion).

*Primary Examiner* — Hieu T Vo
*Assistant Examiner* — Sherman Manley
(74) *Attorney, Agent, or Firm* — Oblon, McClelland, Maier & Neustadt, L.L.P.

(57) ABSTRACT

A method for controlling a pressure inside a fuel tank system including a fuel tank and a controllable pressure relief valve. The method includes assessing whether a predetermined vapor expulsion risk is present, the predetermined vapor expulsion risk pertaining to a vapor expulsion from a main volume of the tank into a space accessible to an operator; if said risk is present, operating the pressure relief valve in accordance with a first pressure threshold, if the risk is not present, operating the pressure relief valve in accordance with a second pressure threshold which is higher than the first pressure threshold.

19 Claims, 3 Drawing Sheets

(56) References Cited

U.S. PATENT DOCUMENTS

| | | | |
|---|---|---|---|
| 2012/0152210 A1* | 6/2012 | Reddy | F02M 25/089 123/520 |
| 2013/0139792 A1 | 6/2013 | Perry et al. | |
| 2014/0013944 A1 | 1/2014 | Haag et al. | |
| 2014/0182360 A1 | 7/2014 | Horiba | |

* cited by examiner

METHOD FOR CONTROLLING A PRESSURE INSIDE VEHICULAR FUEL TANK SYSTEM

The present invention pertains to the field of vehicular fuel tank systems, and in particular to fuel tank systems for hybrid vehicles.

Vehicles propagated by an internal combustion engine may be equipped with a fuel vapor venting circuit, through which fuel vapor is led from the fuel tank, through a canister to the atmosphere. In this manner, a build-up of excessive pressure in the tank, for example under the influence of diurnal temperature changes, can be avoided. A purge circuit is provided through which the internal combustion engine may retrieve the absorbed hydrocarbons when it is put into operation.

Hybrid vehicles are adapted to be propagated alternatingly by means of an electric motor or an internal combustion engine. A specific derivation of the hybrid uses electricity only for the first 60 to 100 km of a given journey, assuming the vehicle was plugged into electrical power for a predetermined amount of time before the journey. These vehicles are deemed "plug-in hybrids". A "plug-in hybrid" vehicle may go many driving cycles without ever running the internal combustion engine. In these circumstances, the canister cannot be expected to be purged on a regular basis, so it must be generally decoupled from the tank to avoid oversaturating the canister. As a result, the fuel tank of such a hybrid vehicle must be designed to contain larger amounts of fuel vapor, and to withstand higher pressure levels.

In the known systems, the fuel tank system under high pressure is locked for access by the vehicle operator to avoid blowing fuel or fuel vapor onto the vehicle operator (e.g., onto his clothes, shoes, hands, face, or other body parts) at the moment he or she opens the tank, which could lead to injury or discomfort. The fuel tank system is unlocked for refueling only after the high pressure inside the fuel tank, which can cause a vapor expulsion upon opening of the fuel tank by the operator, has been relieved via the venting circuit of the fuel tank system. In the known systems, the pressure relief is effectuated at a request of the vehicle operator, who typically has to push a button on a vehicle dashboard in order to indicate a beginning of a refueling process. After the pressure relief has been carried out via various valves and lines in the venting circuit, the fuel tank is unlocked and the vehicle operator obtains access to a main volume of the tank comprising fuel.

A disadvantage of the known systems is that the pressure inside the fuel tank builds up, remains high, and can be released only on request, by pushing the refueling button or performing other manipulations indicating the beginning of the refueling process. Respectively, the fuel tank remains locked until the pressure is released. As a result, a risk of a vapor expulsion onto the vehicle operator exists as long as, due to any reason, the fuel tank system is unlocked and the vehicle operator has access to a tank volume containing fuel vapor under the high pressure. Such a situation is thinkable when a fuel tank flap is broken or unintentionally left in an open position. As a result, the vehicle operator can access the tank volume containing fuel simply by manipulating a fuel cap, and, thereby, trigger a vapor expulsion from the tank onto himself/herself.

It is an object of embodiments of the present invention to provide a method for controlling a pressure inside the fuel tank system which prevents building up inside the fuel tank a pressure above a first predetermined threshold in case a risk of the pressure relief via a filler head opening of the fuel tank is present, which method further allows accumulating a pressure up to a significantly higher second pressure threshold as long as such risk is absent.

The present invention is based inter alia on the insight of the inventor that, in case no locked element prevents the vehicle operator from triggering the pressure relief by establishing fluid communication between a space accessible to the operator and the main volume of the tank, a pressure level inside the fuel tank should remain sufficiently low such that no vapor dangerous expulsion onto the vehicle operator could happen when the operator establishes fluid communication between the space where he/she is located and the main volume of the tank by, for example, manipulating the fuel cap. On the other hand, as long as the fuel tank is locked, thereby preventing the vehicle operator from connecting the space accessible to the operator with the main volume of the tank, the pressure relief in the tank may happen only through valves of a venting arrangement of the fuel tank system, respectively, a higher pressure can be accumulated inside the fuel tank since no vapor expulsion onto the vehicle operator via the filler head opening is possible.

The term "fuel tank" is understood to mean an impermeable tank that can store fuel under diverse and varied environmental and usage conditions, in particular a tank with which motor vehicles are equipped.

Where reference is made to fluid communication, such communication comprises gas and/or liquid communication.

Where reference is made in this description to the main volume of the fuel tank, this refers to any portion of the fuel tank configured to contain or conduct fuel or fuel vapor.

Where reference is made in this description to the filler head opening, this refers to an opening for fluid communication between the space accessible to the operator and the main volume of the tank.

According to an aspect of the invention, there is provided a method for controlling a pressure inside a fuel tank system comprising a fuel tank and a controllable pressure relief valve, the method comprising: assessing whether a predetermined vapor expulsion risk is present, said predetermined vapor expulsion risk pertaining to a vapor expulsion from a main volume of the tank into a space accessible to an operator; if said risk is present, operating said pressure relief valve in accordance with a first pressure threshold, if the risk is not present, operating said pressure relief valve in accordance with a second pressure threshold, wherein the second pressure threshold is higher than the first pressure threshold.

The cited aspect of the invention allows defining two pressure regimes for the fuel tank. One regime corresponds to the situation when a vapor expulsion risk via the filler head opening is present, while another regime corresponds to the absence of a vapor expulsion risk via the filler head opening. In the absence of said risk, a higher pressure may build up inside the fuel tank, up to the second pressure threshold, than in the presence of said risk, in which case only a pressure up to the first pressure threshold is built up inside the fuel tank.

Throughout this application, the terms "depressurization" and "pressure relief" are used to designate the process of balancing the internal fuel system pressure with the ambient pressure. Balancing implies getting the internal fuel system pressure within a small difference of the ambient pressure; this difference may be between −50 mbar and 50 mbar; it is preferably between −20 mbar and 20 mbar; and even more preferably between −10 mbar and 10 mbar.

In an embodiment of the method according to the present invention, the fuel tank system comprises a locking element configured to prevent, in its locked state, a communication from being established between the main volume of the tank and the space accessible to the operator, and the predetermined vapor expulsion risk comprises said locking element not being in its locked state.

According to the cited embodiment, the predetermined vapor expulsion risk is present when a locking element, which is configured to prevent, in its locked state, a communication between the main volume of the tank and the space accessible to the operator, is unlocked due to any reason. Accidentally leaving the fuel flap or filler head cap unlocked is believed to be one of the main causes of fuel spray incidents. Accordingly, the unlocked state of a locking element, which may correspond to the absence of any locked locking element between the main volume of the tank and the space accessible to the operator, is detected and identified as a risk of vapor expulsion.

In an embodiment of the method according to the present invention, the fuel tank system further comprises a control unit being configured to assess the presence of the predetermined vapor expulsion risk.

This control unit may be part of a unit present in the vehicle to control other equipment, such as an ECU.

In an embodiment of the method according to the present invention, such assessment comprises detecting the absence of any locked element between the main volume of the tank and the space accessible to the operator.

In an embodiment of the method according to the present invention, the main volume of the fuel tank comprises a filler neck.

More in general, the main volume of the fuel tank, comprises any portion of the fuel tank configured to contain or conduct fuel or fuel vapor.

In an embodiment of the method according to the present invention, the predetermined vapor expulsion risk comprises a lapse of a predetermined amount of time since a most recent depressurization of at least a portion of the tank.

According to this embodiment, the predetermined vapor expulsion risk is present when, in the absence of any locked element, no valve of the valve arrangement of the fuel tank system has been operated sufficiently recently (i.e., after the last sealing of the system) to depressurize at least a portion of the fuel tank.

In an embodiment of the method according to the present invention, the operating in accordance with the first pressure threshold comprises depressurizing said at least a portion of the tank using the pressure relief valve in case the internal pressure of said at least a portion of the tank is equal to or above the first pressure threshold.

In a particular embodiment, the first pressure threshold is between 30 mbar and 70 mbar; preferably 50 mbar or around 50 mbar. The internal pressure of the fuel tank which is below the values of this embodiment would not result in a vapor expulsion dangerous for the operator, in case the main volume of the tank and the space accessible to the operator are brought in fluid communication with each other. This is due to the fact that a difference between the internal pressure of the fuel tank and the atmospheric pressure is not large enough to result in a powerful vapor expulsion.

In an embodiment of the method according to the present invention, the operating in accordance with a second pressure threshold comprises depressurizing said at least a portion of the tank using the pressure relief valve in case the internal pressure of said at least a portion of the tank is equal to or above the second pressure threshold.

In a particular embodiment, the second pressure threshold is between 330 mbar and 400 mbar; preferably 350 mbar or around 350 mbar. As long as no vapor expulsion dangerous for the operator is possible, the internal pressure of the fuel tank can build up to levels which the tank can safely withstand.

In a particular embodiment, the depressurizing comprises bringing said at least a portion of the tank in communication with the atmosphere or with a volume having an internal pressure which is lower than the internal pressure of said at least a portion of the tank.

In a particular embodiment, said communication passes through a canister adapted to absorb hydrocarbons.

In a particular embodiment, said at least a portion of the tank comprises the portion of the tank adjacent to the space accessible to the operator.

In an embodiment of the method according to the present invention, said assessing whether the predetermined vapor expulsion risk is present comprises establishing that said risk is present if a fuel flap is found in one or more of an open, unlocked, broken, and malfunctioning state.

In an embodiment of the method according to the present invention, a fuel cap 190 or a closure mechanism comprises a lock and said assessing whether the predetermined vapor expulsion risk is present comprises establishing that said risk is present if said lock is found in one or more of an unlocked, broken, and malfunctioning state.

In an embodiment of the method according to the present invention, the fuel tank system is adapted to contain gasoline.

The present invention is particularly useful in the context of fuel tank systems for storing gasoline, because that type of fuel generates significant amount of vapor when the temperature increases and thus builds-up pressure inside the fuel tank.

In an embodiment of the present invention, a fuel tank system comprises a fuel tank, a controllable pressure relief valve, and a control unit, wherein said control unit is configured to control said controllable pressure relief valve so as to carry out the method according to any of the preceding claims.

According to an aspect of the invention, there is provided a plug-in hybrid vehicle comprising the fuel tank system described above.

According to an aspect of the invention, there is provided a computer program product, comprising code means configured to make a controller carry out the method as described above.

BRIEF DESCRIPTION OF THE SEVERAL VIEWS OF THE DRAWINGS

These and other aspects and advantages of the present invention will now be described in more detail with reference to the accompanying drawings, in which.

Figure 1:
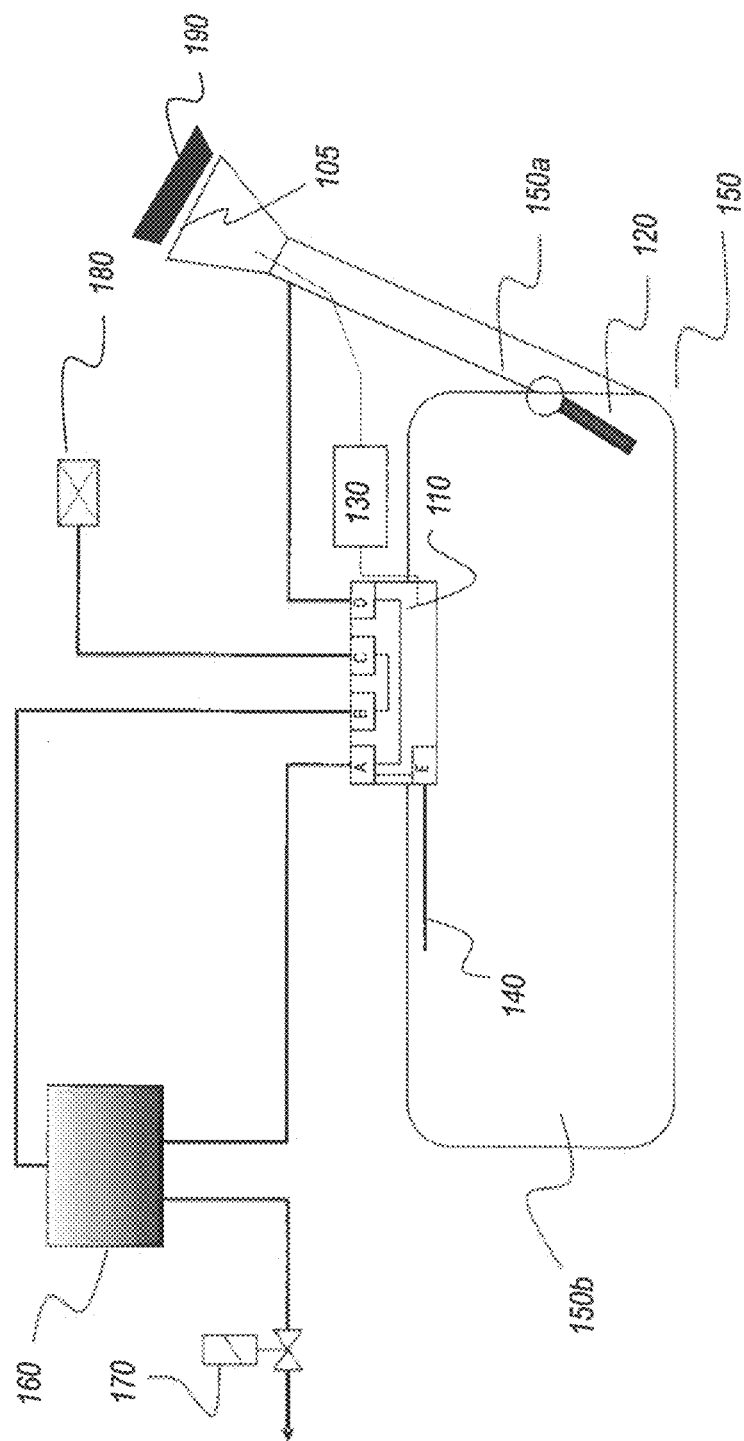
FIG. 1 schematically represents a fuel system according to an embodiment of the present invention.

The system of FIG. 1 includes a fuel tank 150 comprising a fuel tank volume 150*b* communicating with a filler neck 150*a* ending in a filler head opening 105.

Without loss of generality, the illustrated filler head opening 105 may be configured to be closed off by a fuel cap 190. A capless arrangement, with a suitable closure mechanism integrated in the filler head opening 105, may also be used.

The closure mechanism may, alternatively or additionally, be integrated in a filler head or a filler neck. The skilled person would understand that any element or combination of elements configured to close a main volume of the fuel tank 150 from a space accessible to the vehicle operator may be used as the closure mechanism.

Where reference is made to a closed fuel tank 150, this refers to a state wherein the main volume of the fuel tank 150 is separated from the space accessible to the vehicle operator such that no fluid communication is present between the main volume of the fuel tank 150 and the space accessible to the vehicle operator. For example, the main volume of the fuel tank 150 is sealed or essentially sealed from the space accessible to the vehicle operator by one or more elements.

Where reference is made to a locked fuel tank 150, this refers to a state wherein no communication between the main volume of the fuel tank 150 and the space accessible to the vehicle operator can be established by manipulating any fuel tank 150 closing element as long as a locking element, which is configured to prevent, in its locked state, a communication from being established between the main volume of the tank 150 and the space accessible to the operator, is in its locked state.

The fuel tank 150 used in embodiments of the present invention is preferably made of plastic (i.e. its wall is principally made of plastic). The term "plastic" means any material comprising at least one synthetic resin polymer. Any type of plastic may be suitable. Particularly suitable plastics belong to the category of thermoplastics.

The fuel tank volume 150b is vented via an internal vent line 140, whose open end is situated in an upper portion of the tank, which normally constitutes the "vapor dome" above the surface of the liquid fuel present in the tank. The venting circuit further preferably includes a canister 160 and lines that connect the clean-air end of the canister to the atmosphere via an atmosphere port 180. If present, the canister 160 can be purged from its fuel-vapor end over a line that connects to the internal combustion engine via the canister purge valve 170. An additional valve (not shown) may be present in the vent line to block access to the canister, so as to avoid exposing it to fuel vapor for extended periods of time without intermediate purging.

The different stages of the pressure relief process according to the present invention are controlled by a valve arrangement, a non-limiting example of which is illustrated as valve arrangement 110, and described in more detail herein below. The valve arrangement 110 may consist of one or more valves of any of the various types known to the skilled person, which are configured to allow opening or sealing of the following valve channels:

Port D to Port A: this valve channel allows fuel vapor present in the filler neck 150a to reach the canister 160;
Port E to Port A: this valve channel allows fuel vapor present in the vapor dome of the fuel tank volume 150b to reach the canister 160;
Port B to Port C: this valve channel allows relatively clean air from the clean-air side of the canister 160 to reach the atmosphere port 180.

Preferably, the valve arrangement 110 is further configured to prevent reverse flows from the canister 160 to the fuel tank volume 150 or the filler neck 150a at all times.

On the other hand, an inflow of clean air (via respective port connections C-D and/or C-E) may optionally be permitted to relieve a situation of underpressure in the fuel tank volume 150b and/or the filler neck 150a.

According to the present invention, the depressurization of the fuel tank system 150 may be carried out in different ways.

According to embodiments of the present invention, the fuel tank 150 may be depressurized by opening one or more of valve channels in the exemplary valve arrangement 110.

Venting the fuel tank 150 can be achieved by opening valve channels E-A and B-C and/or valve channels D-A and B-C.

According to a particular embodiment of the present invention, first, the depressurization of the filler pipe 150a takes place. The depressurization of the rest of the fuel tank 150b may start substantially simultaneously with the depressurization of the filler pipe 150a and continue thereafter, in order to achieve a lowest possible pressure in the fuel tank 150 in a shortest period of time. Alternatively, the depressurization of the rest of the fuel tank 150b could start when the depressurization of the filler pipe 150a is finished.

In this particular embodiment, the fuel tank 150 may comprise an internal check valve 120 which seals the filler neck 150a from the rest of the fuel tank volume 150b.

According to this particular embodiment, venting of the filler neck 150a can be achieved by opening valve channels D-A and B-C, while the internal check valve 120 is kept closed. Depending on the arrangement of the valve(s), it may be necessary to also close valve channel E-A at this stage. Venting of the rest of the fuel tank volume 150b can be achieved by opening valve channels E-A and B-C, while the internal check valve 120 is kept closed.

The valve arrangement 110 may be a fully automated arrangement, or an assembly of one or more valve elements that are externally managed, for example by the ECU or a dedicated fuel system control unit.

According to embodiments of the present invention, the fuel tank system comprises a controlling element illustrated in FIG. 1 as a fuel system control unit 130. The control unit 130 is configured to control a pressure inside the fuel tank 150 in accordance with the corresponding embodiments of the present invention.

To that effect, control unit 130 is configured to receive signals from various sensors and actuate a pressure relief valve, in particular by controlling the appropriate elements in the valve arrangement 110.

In particular, the control unit 130 is configured to assess whether a predetermined vapor expulsion risk, a vapor expulsion from the fuel tank 150 into the space where the operator is located due to potential opening of the fuel tank 150 by the operator, is present.

To that effect, the control unit 130 may be configured to detect the absence of any locked element between the main volume of the fuel tank 150 and the space accessible to the operator, wherein said element, i.e., a locking element, is configured to prevent, in its locked state, a communication being established between the main volume of the tank 150 and the space accessible to the operator.

According to embodiments of the present invention, one or more of the following means may be used as the locking element between the main volume of the fuel tank 150 and the space accessible to the operator: the fuel flap, the fuel cap, and the closure mechanism.

According to embodiments of the present invention, the control unit 130 may be configured to detect a signal indicative of the absence of any locked element between the main volume of the fuel tank 150 and the space accessible to the operator.

To that effect, the control unit 130 may be configured to detect a signal indicative of one or more of the unlocked fuel flap, the unlocked fuel cap, and the unlocked closure mechanism. Additionally or alternatively, the control unit 130 may be configured to receive a signal indicative of one or more of the fuel flap being in an open position, the unlocked fuel flap, and the fuel flap in a broken state.

When the control unit 130 has detected the absence of any locked element between the main volume of the tank 150 and the space accessible to the operator that indicates that the vehicle operator can bring the fuel tank 150 into fluid communication with the space where the operator is located by, for example, manipulating the fuel cap 190 or the closure mechanism and, thereby, can trigger a vapor expulsion from the fuel tank 150 in his/her direction.

Therefore, in case the absence of any locked element is detected, the control unit 130 initiates the operating a pressure relief valve in accordance with a first pressure threshold.

According to embodiments of the present invention, the operating in accordance with the first pressure threshold refers to assessing the internal pressure of the fuel tank 150 and, in case the pressure inside the fuel tank 150 is equal to or above the first pressure threshold, depressurizing the fuel tank 150 using the pressure relief valve.

To that effect, control unit 130 may actuate the valve arrangement 110 to operate according to the first pressure threshold.

In case the pressure inside the fuel tank 150 is equal to or above the first pressure threshold, a difference between the internal pressure of the fuel tank 150 and the atmospheric pressure is large enough to cause a vapor expulsion onto the operator in case the fuel tank 150 is brought into communication with the atmosphere. Therefore, in case the control unit 130 detects that the pressure inside the fuel tank 150 which is equal to or above the first pressure threshold, the control unit 130 actuates the depressurization of the fuel tank 150 according to any of the above described depressurization methods.

Therefore, according to an embodiment of the present invention, in case the fuel tank 150 is unlocked for the operator access, due to, for example, the fuel flap being unintentionally left in an open position after the refueling process, the control unit 130 will instruct the valve arrangement 110 to depressurize the fuel tank 150 as long as the internal pressure equal to the first pressure threshold is reached. In this case, the internal pressure inside the fuel tank 150 will be maintained under the first pressure threshold, or at least return to a value below the first pressure threshold very quickly after exceeding it, thereby ensuring safety for the vehicle operator.

According to another scenario, the fuel tank 150 may become unexpectedly unlocked for the operator due to a malfunctioning locking element or due to the locking element being broken (e.g., as a result of an attempted fuel theft). Upon detecting the absence of any locked element, the control unit 130 will instruct the valve arrangement 110 to depressurize the fuel tank 150 as long as the internal pressure inside the fuel tank 150 is equal to or above the first pressure threshold. According to an embodiment of the present invention, the control unit 130 may actuate one or more valves, e.g., one or more valve channels of the exemplary valve arrangement 110 depending on a level of the internal pressure inside the fuel tank 150. That is, the higher the internal pressure, the faster depressurization is needed, the more valve channels to be used substantially simultaneously for depressurization of the fuel tank 150.

According to embodiments of the present invention, in case the control unit 130 determines the presence of at least one locking element in its locked state between the main volume of the tank 150 and the space accessible to the operator, that indicates that the fuel tank 150 is locked for the operator such that the vehicle operator can't access the main volume of the fuel tank 150 by manipulating any element separating him/her from the main volume of the fuel tank 150.

The fuel tank 150 may be locked, for example, by locking the fuel flap. In case the fuel cap 190 or the closure mechanism comprises a lock, the locking of the fuel tank 150 may be realized by locking the lock of the fuel cap 190, respectively, the closure mechanism. When the fuel tank 150 is locked, the operator can't establish a communication between the main volume of the fuel tank 150 and the atmosphere by manipulating, for example, the fuel cap 190 or the closure mechanism or any other parts separating him/her from the main volume of the fuel tank 150. That means that even if the depressurization is actuated in the fuel tank 150, it takes place via the valve arrangement 110 and does not carry safety risks for the operator. In such a situation the pressure inside the fuel tank 150 can be quite high, up to a second pressure threshold, given that it will return to a value below the second pressure threshold very quickly after exceeding it.

According to embodiments of the present invention, in case no vapor expulsion risk has been detected by the control unit 130, the control unit 130 initiates the operating the pressure relief valve in accordance with the second pressure threshold.

To that effect, in case the control unit 130 determines the presence of at least one locking element in its locked state, said locking element being configured to prevent, in its locked state, a communication being established between the main volume of the tank 150 and the space accessible to the operator, the control unit 130 initiates the operating the pressure relief valve in accordance with the second pressure threshold.

According to embodiments of the present invention, the operating in accordance with the second pressure threshold refers to assessing the internal pressure of the fuel tank 150 and, in case the pressure inside the fuel tank 150 is equal to or above the second pressure threshold, depressurizing the fuel tank 150 using the pressure relief valve.

To that effect, control unit 130 may actuate a pressure relief valve, in particular the appropriate elements of the exemplary valve arrangement 110, to operate according to the second pressure threshold.

The second pressure threshold is higher than the first pressure threshold since the second pressure threshold is defined by a pressure which the fuel tank 150 can withstand or safely withstand, while the first pressure threshold is defined by a pressure difference with the atmospheric pressure which can cause an expulsion dangerous for the operator.

Figure 2:
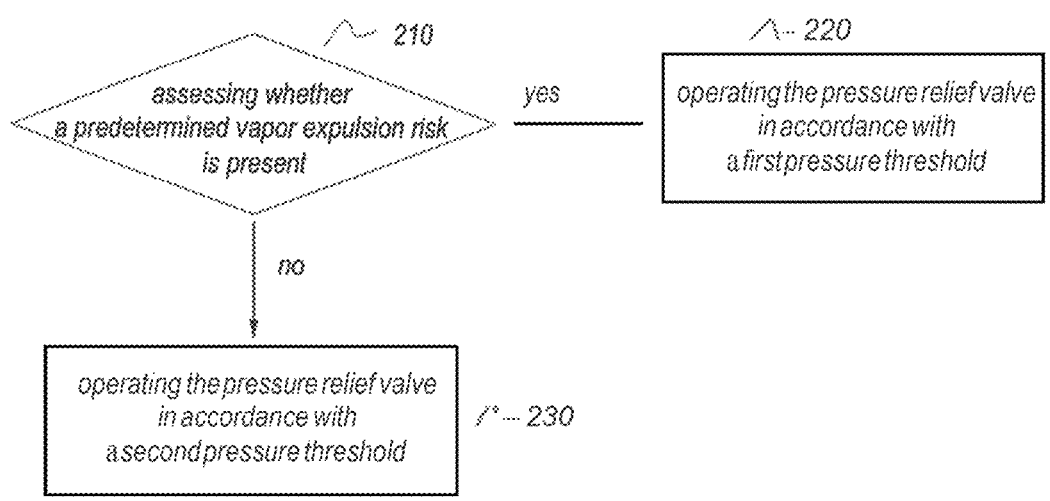
FIG. 2 present a flow chart of a method according to an embodiment of the present invention.
Figure 3:
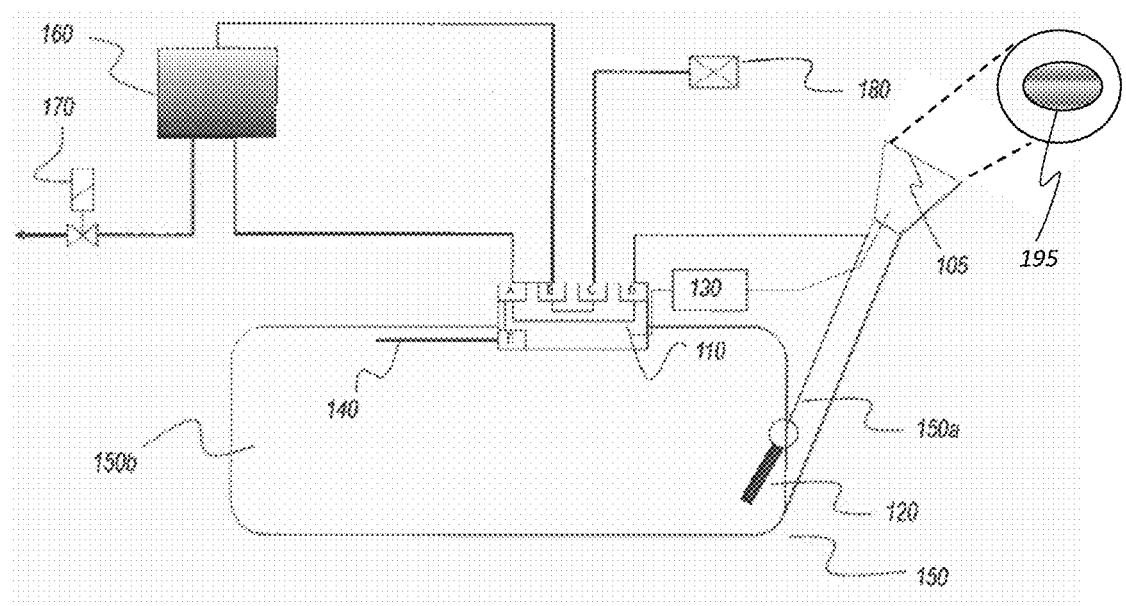
FIG. 3 schematically represents a fuel system according to an alternative view of the present invention in which a fuel flap 195 is shown at the top of the filler head opening 105.

An embodiment of the method for controlling a pressure inside the fuel tank system of the invention is illustrated in FIG. 2.

In step 210, an assessment is made whether the predetermined vapor expulsion risk is present, the vapor expulsion from the main volume of the tank 150 into the space accessible to the operator. In case such a risk is present, in step 220, the pressure relief valve is operated in accordance with the first pressure threshold. In case such a risk is not present, in step 230, the pressure relief valve is operated in accordance with the second pressure threshold. The risk assessment may be repeated intermittently or on a continuous basis (repetitions are not shown in the flow chart), to ensure a persistent level of safety for the operator.

Where reference is made in the above description to a "vehicle operator", this refers without limitation to any person who, at a given time, is involved in the operations concerning the vehicle. It may be a gas station attendant, a driver, a mechanic, etc.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A method for controlling a pressure inside a fuel tank system comprising a fuel tank, a filler neck, a control unit, a valve arrangement, a canister, and a controllable pressure relief valve, the method comprising:
assessing in said control unit, which receives signals from one or more sensors for determining a first pressure threshold and a second pressure threshold, whether a predetermined vapor expulsion risk is present, said predetermined vapor expulsion risk pertaining to a vapor expulsion from a main volume of the tank into a space accessible to an operator;
if said risk is present, operating said pressure relief valve in accordance with the first pressure threshold,
if the risk is not present, operating said pressure relief valve in accordance with the second pressure threshold,
wherein the second pressure threshold is higher than the first pressure threshold, and
wherein the valve arrangement allows fuel vapor present in the filler neck to reach the canister without going through the tank.

2. A fuel tanks system comprising a fuel tank, a filler neck, the control unit, a valve arrangement, a canister, and a controllable pressure relief valve, wherein said control unit comprises a computer program product comprising code means configured to make a control unit carry out the method according to claim 1.

3. A fuel tank system comprising a fuel tank, a filler neck, a valve arrangement, a canister, a controllable pressure relief valve, and a control unit, wherein said control unit is configured to control said controllable pressure relief valve so as to carry out the method according to claim 1.

4. A plug-in hybrid vehicle comprising the vehicular fuel tank system according to claim 3.

5. A method for controlling a pressure inside a fuel tank system comprising a fuel tank, a filler neck, a control unit, a valve arrangement, a canister, and a controllable pressure relief valve, the method comprising:
assessing in said control unit, which receives signals from one or more sensors for determining a first pressure threshold and a second pressure threshold, whether a predetermined vapor expulsion risk is present, said predetermined vapor expulsion risk pertaining to a vapor expulsion from a main volume of the tank into a space accessible to an operator;
if said risk is present, operating said pressure relief valve in accordance with the first pressure threshold,
if the risk is not present, operating said pressure relief valve in accordance with the second pressure threshold,
wherein the second pressure threshold is higher than the first pressure threshold, and
wherein the first pressure threshold and the second pressure threshold are positive pressures.

6. The method according to claim 5, wherein the first pressure threshold is between 30 mbar and 70 mbar and/or the second pressure threshold is between 330 mbar and 400 mbar.

7. A fuel tank system comprising a fuel tank, a filler neck, a valve arrangement, a canister, a controllable pressure relief valve, and a control unit, wherein said control unit is configured to control said controllable pressure relief valve so as to carry out the method according to claim 5.

8. A plug-in hybrid vehicle comprising the vehicular fuel tank system according to claim 7.

9. A fuel tanks system comprising a fuel tank, a filler neck, the control unit, a valve arrangement, a canister, and a controllable pressure relief valve, wherein said control unit comprises a computer program product comprising code means configured to make a control unit carry out the method according to claim 5.

10. The method according to claim 5, wherein the fuel tank system comprises a locking element configured to prevent, in its locked state, a communication from being established between the main volume of the tank and the space accessible to the operator, and wherein said predetermined vapor expulsion risk comprises said locking element not being in its locked state.

11. The method according to claim 10, wherein said predetermined vapor expulsion risk further comprises a lapse of a predetermined amount of time since a most recent depressurization of at least a portion of the tank.

12. The method according to claim 11, wherein said at least a portion of the tank comprises a portion of the tank adjacent to the space accessible to the operator.

13. The method according to claim 5, wherein said main volume comprises the filler neck.

14. The method according to claim 5, wherein said operating in accordance with the first pressure threshold comprises depressurizing at least a portion of the tank using the pressure relief valve in case the internal pressure of said at least a portion of the tank is equal to or above the first pressure threshold.

15. The method according to claim 14, wherein said depressurizing comprises bringing said at least a portion of the tank in communication with the atmosphere or with a volume having an internal pressure which is lower than the internal pressure of said at least a portion of the tank.

16. The method according to claim 15, wherein said communication passes through a canister adapted to absorb hydrocarbons.

17. The method according to claim 5, wherein said operating in accordance with a second pressure threshold comprises depressurizing at least a portion of the tank using the pressure relief valve in case the internal pressure of said at least a portion of the tank is equal to or above the second pressure threshold.

18. The method according to claim 5, wherein said assessing whether the predetermined vapor expulsion risk is present comprises establishing that said risk is present if a fuel flap is found in one or more of an open, unlocked, broken, and malfunctioning state.

19. The method according to claim 5, wherein a fuel cap or a closure mechanism comprises a lock and said assessing whether the predetermined vapor expulsion risk is present comprises establishing that said risk is present if said lock is found in one or more of an unlocked, broken, and malfunctioning state.

* * * * *